United States Patent [19]

Landoni et al.

[11] Patent Number: 5,447,991
[45] Date of Patent: Sep. 5, 1995

[54] FLAME-RESISTANT POLYOLEFINIC FIBRES AND FILMS

[75] Inventors: Gianluigi Landoni; Carlo Neri, both of Milan, Italy

[73] Assignee: Enichem Synthesis S.p.A., Palermo, Italy

[21] Appl. No.: 242,037

[22] Filed: May 12, 1994

Related U.S. Application Data

[63] Continuation-in-part of Ser. No. 32,425, Mar. 15, 1993, abandoned, which is a continuation of Ser. No. 727,123, Jul. 9, 1991, abandoned.

[30] Foreign Application Priority Data

Jul. 11, 1990 [IT] Italy ................... 20905/90

[51] Int. Cl.$^6$ ............................................. C08L 23/02
[52] U.S. Cl. ................................... 525/167; 525/177
[58] Field of Search .................... 525/167, 176

[56] References Cited

U.S. PATENT DOCUMENTS

| | | |
|---|---|---|
| 4,033,936 | 7/1977 | Bollert et al. |
| 4,315,847 | 2/1982 | Login ................... 528/287 |
| 4,517,355 | 5/1985 | Mercati ................. 528/287 |
| 4,812,502 | 3/1989 | Cipriani ................ 524/125 |
| 4,981,945 | 1/1991 | Landoni ................ 528/287 |

FOREIGN PATENT DOCUMENTS

| | | |
|---|---|---|
| 334423 | 3/1989 | European Pat. Off. |
| 59-187023 | 10/1984 | Japan |
| 62-185710 | 8/1987 | Japan |
| 62-292850 | 12/1987 | Japan |
| 63-133589 | 6/1988 | Japan |
| 63-227629 | 9/1988 | Japan |

*Primary Examiner*—Patricia A. Short
*Attorney, Agent, or Firm*—Oblon, Spivak, McClelland, Maier & Neustadt

[57] ABSTRACT

Polyolefinic fibres and films are made flame-resistant by the addition of a flame-resistant additive made up of a copolyester containing units deriving from: a) terephthalic acid; b) alkylenic glycol ($C_2$—$C_6$); and c) phenyl hydroxymethylene phosphinic acid.

These fibres and films are prepared by the transformation into its molten state of a mixture of polyolefin and flame-resistant additive.

5 Claims, No Drawings

FLAME-RESISTANT POLYOLEFINIC FIBRES AND FILMS

This application is a continuation-in-part of application Ser. No. 08/032,425, filed on Mar. 15, 1993, now abandoned, which is a continuation of Ser. No. 07/727,123, filed Jul. 9, 1991, now abandoned.

BACKGROUND OF THE INVENTION

1. Field of the Invention

The present invention concerns flame-resistant polyolefinic fibres and films and the procedure for their preparation.

2. Discussion of the Background

Polyolefins are widely used in the production of manufactures such as films and fibres and the necessity for having flame-resistant polyolefinic products is strongly felt, particularly for safety reasons in the various fields where they are used, for example, in the textile industry.

Various flame-resistant additives have been proposed in the art to give polyolefins flame-resistant properties: these generally consist of organic compounds containing phosphorous or halogen or both or halogenated compounds combined with a metallic oxide, as described by J.W. Lyons, in "The Chemistry and Uses of Fire Retardants", Wiley Interscience 1970, pages 286–297.

The flame-resistant additives already known are not, however, entirely satisfactory, mainly because of their incompatibility with polyolefins and also the high amounts required to give the necessary flame-resistant characteristics.

Flame-resistant monomers such as phenyl hydroxymethylene phosphinic acid and its alkyl esters:

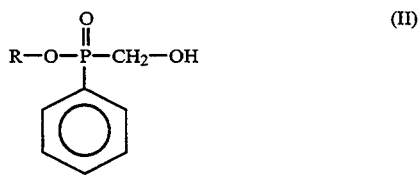

(where R is hydrogen or a lower alkyl), are described in U.S. Pat. No. 4,517,355 together with how they are used for making linear polyesters flame-resistant.

Oligomeric flame-resistant compounds having the formula:

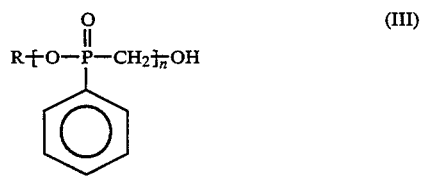

(where R has the above meaning and n has a value, or an average value which ranges from 2 to 50), are described in U.S. Pat. No. 4.812.502 together with how they are used for making linear polyesters flame-resistant.

In the European patent application no. 334.423 a linear copolyester is described, which is used as a flame-resistant agent and which contains in its macromolecule units deriving from: terephthalic acid; alkylenic glycol ($C_2$—$C_6$); and phenyl hydroxymethylene phosphinic acid, in a ratio from 1:1:0.2 to 1:1:1, in which units (c) are distributed at random between units (a) and (b), obtained by the brief contact at melting conditions of a linear polyester derived from terephthalic acid and an alkylenic glycol ($C_2$—$C_6$), with an oligomer (II).

SUMMARY OF THE INVENTION

It has now been discovered that some copolyesters, subject of the above-mentioned European patent application, can be mixed with a polyolefin and are able to give flame-resistant properties to fibres and films obtained starting from said mixture containing low quantities of copolyesters.

DETAILED DESCRIPTION OF THE PREFERRED EMBODIMENTS

In accordance with this, one of the aspects of the present invention concerns flame-resistant fibres and films which include a polyolefin and a flame-resistant additive consisting of a copolyester containing units deriving from: (a) terephthalic acid; (b) alkylenic glycol ($C_2$—$C_6$); and (c) phenyl hydroxymethylene phosphinic acid, having the basic formula:

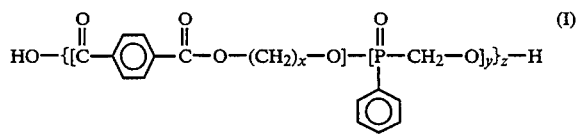

where:

x is a number ranging from 2 to 6;
y is a number ranging from 0.5 to 1; and
z is a number ranging from 2 to approx. 7.

The flame-resistant additive (I) is preferably a copolyester containing units deriving from: (a) terephthalic acid; (b) ethylene glycol (x=2 in formula (I)); and (c) phenyl hydroxymethylene phosphinic acid. This additive has a molecular weight ranging from approx. 700 to approx. 2,000, a phosphorous content ranging from 6 to 8.8% by weight (considered as an element) and an amorphous or partially crystalline structure, with a softening or partial melting point lower than 200° C., normally ranging from 160° to 195° C. The melting point of the additive is an important characteristic to allow it to homogenize in its melted state with a polyolefin.

Another aspect of the present invention concerns a procedure for the preparation of flame-resistant polyolefinic fibres and films, which includes mixing and homogenizing, in the melted state (temperatures approx. 240°–280° C.), the additive (I) and polyolefinic polymer and the subsequent transformation of the homogeneous mixture into fibre or film. The flame-resistant additive (I) can be added to the polyolefin after drying, for example at 150° C. under vacuum, during processing in the melting state, before extrusion to form the fibre or film.

With the present invention, flame-resistant fibres and films can be obtained, starting from the usual polyolefins such as low, medium and high density polyethylene, polypropylene and the copolymers of two or more olefins. The most suitable polyolefin for this particular purpose is polypropylene.

The quantity of additive (I) for giving flame resistant properties should be sufficient to assure a phosphorous (considered as a metal) content in the polyolefinic fibre or film of from 0.1 to 3.0% by weight, preferably from 0.25 to 1.0% by weight.

The following experimental examples are intended to provide a clearer illustration of the present invention.

EXAMPLE 1

3,200 g of a prepolymer of polyethylene terephthalate having an average molecular weight of approx 500 and 0.04% by weight of said prepolymer, of phosphoric acid and antimony(III) oxide are charged into a 10 liter reaction vessel. The mixture is heated, under stirring, to 270°–280° C. and the pressure is lowered from 760 torr. to less than 1 torr. over a period of 1.5 hours. When a polyethylene terephthalate fibre grade (intrinsic viscosity approx. 0.65 dl/mg) is obtained, 1,400 g of an oligomer corresponding to formula (III) where R is partly $C_4$ alkyl and partly hydrogen, n has an average value of 4.1 and with a phosphorous content of 19.4% by weight, are added using a suitable charging cylinder equipped with a heating jacket (temperature of 150° C.). There is a temporary fall in the viscosity of the mixture and a sharp lowering of the temperature. The high vacuum is re-applied and within 15 minutes, a vacuum of 0.03 torr. and an intrinsic viscosity value of approx. 0.40 dl/g are obtained. The product is discharged, at a temperature of 215° C., through a valve situated at the bottom of the reaction vessel, in the form of thin strip which, after cooling, is cut into chips.

The resulting flame-resistant additive is submitted to elementary analysis and acidimetric titration. The latter is carried out by dissolving the product in orthocresol and chloroform (1:1 by weight) and titrating it with an 0.5 M ethanol solution of tetraethylammonium hydroxide. In this way, the molecular weight is obtained through the acidity of the product, which in its turn is a function of the values of y and z in formula (I). More specifically, the additive thus obtained has a molecular weight of around 1,456, a phosphorous content of 6.53% by weight and can be defined with the formula:

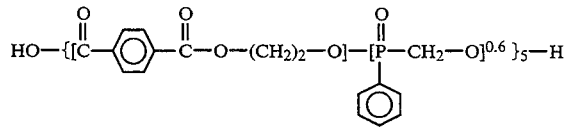

The additive which on DSC shows a melting point of 194° C. for the crystalline part, is used as a flame-resistant agent for polypropylene in Example 2 which follows.

EXAMPLE 2

The additive of Example 1 is micronized and a mixture is prepared, containing:

| | |
|---|---|
| polypropylene flakes (Moplen FL F20; Himont) | 943 g |
| additive example 1: | 55 g |
| Anox 20*: | 1 g |
| Alkanox 240**: | 1 g |

\* = Commercial trade-name of Enichem Synthesis; tetrakis methylene (3.5-di-ter-butyl-4-hydroxy) hydrocinnamate;
\*\* = Commercial trade-name of Enichem Synthesis; tris(2,4-di-ter-butyl phenyl)-phosphite.

The dry blend is mixed for 10 minutes at 70 revs/minute in a Hentschel mixer and is then extruded in a Brabender extruder (19 mm screw), with a compression ratio of 4:1, equipped with a flat head. The following thermal profile is used: 200°, 225°, 235° and 250° C. Using a drawing ratio of 3:1, after water cooling an opalescent, 50 micrometer thick film is obtained, showing good mechanical characteristics.

Substatially no water carryover was observed in the resulting thick film and upon complete drying such film remained flat, no curling up of the edges taking place.

A second test (comparative) is carried out with a formulation of polypropylene, Anox 20 and Alkanox 240 and a third test (comparative) with a formulation of polypropylene, Anox 20, Alkanox 240 and a commercial flame-resistant product containing bromine derivatives and inorganic substances (Sandoflam ® 5072 of Sandoz), with the same quantity of additive and under conditions as used in Example 1.

50 cm of each of the films obtained in the three abovementioned tests, having a width of 70 mm and a thickness of 50 micrometers, are fixed at one of their ends to a vertical support. The behaviour of the films is observed when they are submitted to the action of a flame obtained by using a 10 mm diameter bunsen, giving the oxidizing flame a 19 mm high blue cone, for the time necessary to start the flame on the whole width of 70 mm.

In the case of the film used in the first test, containing the flame-resistant additive of the present invention, the flame is extinguished almost immediately after the flame is removed. The film of the second test sample (without any flame-resistant agents) undergoes complete combustion whereas, the film of the third test sample (containing a commercial flame-resistant product) requires extinguishment times of 2–3 seconds. In the latter case, there was also a development of fumes which were somewhat denser than in the other cases.

We claim:

1. Flame-resistant fibres and films characterized by the fact that they include a polyolefin and a flame-resistant additive (I) consisting of a copolyester containing units derived from: (a) terephthalic acid; (b) ethylene glycol; and (c) phenyl hydroxymethylene phosphinic acid, having the basic formula:

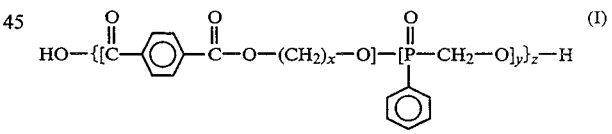

where:
x is 2;
y is a number ranging from 0.5 to 1; and
z is a number ranging from 2 to approx. 7;
said additive (I) having a molecular weight ranging from approx. 700 to approx. 2,000, a phosphorous content ranging from 6 to 8.8% by weight, and an amorphous or partially crystalline structure, with a softening or partial melting point lower than 200° C.,
and said flame-resistant films and fibres characterized by the fact that they contain a quantity of additive (I) for giving flame-resistant properties which is such as to assure a phosphorous content from 0.1 to 3.0% by weight with respect to the fibres or films.

2. Flame-resistant films and fibres according to claim 1, characterized by the fact that said polyolefin is low, medium and high density polyethylene, polypropylene or a copolymer of two or more olefins.

3. Flame-resistant films and fibres according to claim 1, wherein the additive (I) has a phosphorous content of from 0.25 to 1.0% by weight with respect to the fibre or film.

4. Flame-resistant films and fibres according to claim 1, wherein the polyolefin is polypropylene.

5. Flame-resistant films and fibres according to claim 1, wherein said additive (I) has a softening or partial melting point ranging from 160° to 195° C.

* * * * *